UNITED STATES PATENT OFFICE.

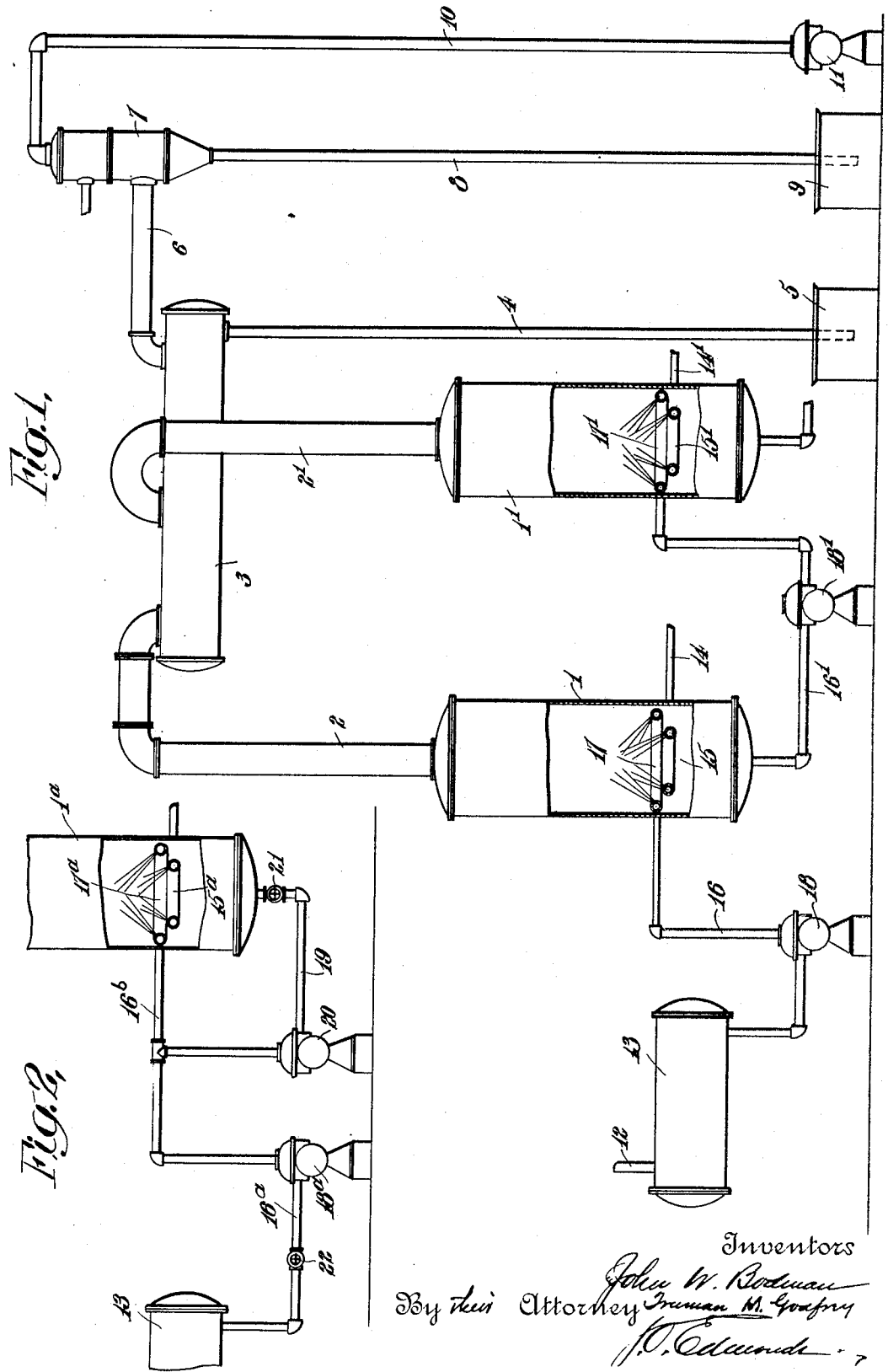

JOHN W. BODMAN, OF WESTERN SPRINGS, AND TRUMAN M. GODFREY, OF CHICAGO, ILLINOIS, ASSIGNORS TO WILLIAM GARRIGUE & COMPANY, INC., OF NEW YORK, N. Y., A CORPORATION OF NEW YORK.

DEODORIZATION OF OILS.

1,385,660.   Specification of Letters Patent.   Patented July 26, 1921.

Application filed August 12, 1919. Serial No. 316,940.

*To all whom it may concern:*

Be it known that we, JOHN W. BODMAN and TRUMAN M. GODFREY, both citizens of the United States, the former residing at Western Springs, in the county of Cook and State of Illinois, and the latter residing at Chicago, in the county of Cook and State of Illinois, have invented certain new and useful Improvements in the Deodorization of Oils, of which the following is a specification.

Our invention relates to a process of purifying and deodorizing oils and suitable apparatus in which the said process may be carried out. The oils upon which the process may be practised are, of course, those having disagreeable odors or flavors, or both, which may be removed to considerable extent by the volatilization of certain constituents of the oil which are more readily volatile than the remainder of the oil.

Our improved process comprises certain steps which result in effective deodorization of the oil without producing deterioration of or harmful effects on the purified oil. Beneficial results may be obtained by the use of some of the steps referred to without the others, the best effect, however, being obtained by the conjoint use of all of the same.

Briefly, the preferred form of our process consists in the introduction of the oil in the form of spray into contact with a gaseous carrier which may be superheated steam or hydrogen or other vapor or gas, the use of hydrogen or other non-oxidizing substance being preferred. The mingling of the sprayed oil and carrier preferably takes place in a vacuum, as in a still which is connected with a vacuum-pump and a condenser. A very small body of oil is permitted to remain in the still, and this is preferably quickly removed therefrom. In the preferred form of the invention the oil is preheated, and after its introduction into the place in which evaporation of the odorous bodies takes place, the unevaporated oil is quickly removed and is again passed through spraying nozzles into contact with the gaseous carrier, the process being repeated a number of times, if necessary, until the deodorization has been completed.

In the form of process commonly practised, a substantial body of oil is maintained in a still, and steam or other gaseous carrier is continuously bubbled up through the same. In such a process there is not such a large surface area of oil effective for evaporation as in the case where the oil and carrier are mingled by spraying both of the same together or where the oil is sprayed into contact with a current of the gaseous carrier. Also in the former practice the body of oil standing in the still is exposed to a temperature at which deodorization takes place, for a considerable time, and this tends to deteriorate the oil because of the tendency of the oil to split off the glycerol base from the fatty acid radical. As soon as this splitting takes place, even though it be accompanied by only a slight increase of free fatty acids, a marked deterioration of the oil is noted both in the flavor and odor of the same as well as in its keeping properties.

In our improved process the conjoint effect of spraying the oil and of using vacuum in the system is to produce a most effective evaporation of the odor-bearing bodies, the temperature at which the sprayed oil and carrier are mixed being suitable to achieve this result. The effect of the vacuum is to reduce the temperature at which evaporation takes place, so that there is less danger of deteriorating the unevaporated oil. The maintenance of the vacuum by the condenser and vacuum pump also causes a rapid removal of the carrier and evaporated bodies from the still or place at which the mingling of the carrier and evaporated oil is accomplished, this rapidity of movement being of considerable assistance in increasing the rate of evaporation of the odor-bearing bodies. The deterioration of the unevaporated oil is also prevented by the fact that the oil is maintained at a low level in the still, and is preferably rapidly withdrawn therefrom so that it will not be subject to the heat which is required for the evaporation of the odor-bearing bodies, except for a very short time. We find that substantially all of the odor-bearing bodies may be removed by the process outlined above, the oil being removed from the still and again sprayed therein, or in a number of other stills, the process being repeated as many times as is necessary.

The process may be carried out with superheated steam. This has a somewhat oxidizing effect upon the oil, however, and it is deemed preferable to employ vapors of a non-oxidizing character which may be preheated to a suitable degree. Hydrogen gas is apparently the most effective carrier for the purpose, partly because of its lightness and expansibility, this gas leaving the still more rapidly than heavier gases or vapors. The effectiveness of the process seems to increase somewhat in accordance with the speed with which the gaseous carrier and vaporized oil travel away from the point at which the same are mingled. It is noted that hydrogen when used as a carrier seems to have a stabilizing effect on the oil, in that the purified oil has less tendency to develop new odors and flavors than oil which has been deodorized by the use of steam.

Suitable apparatus comprised within our invention will be described more fully in the following specification. In order that a clearer understanding of our invention may be had, attention is hereby directed to the accompanying drawings forming part of this application and illustrating certain ways in which the process may be carried out and certain forms of apparatus which may be employed. In the drawings, Figure 1 represents somewhat diagrammatically a side elevation of a system comprising our invention, certain parts being shown in cross section; and Fig. 2 is a similar partial view of a modified form of apparatus.

Referring first to Fig. 1 of the drawings, the still 1 is shown as connected by a pipe 2 to a condenser 3 which has a vertical connection 4 extending downwardly to a catch basin 5. Condenser 3 is also connected by a pipe 6 to a barometric condenser indicated at 7 having a vertical pipe 8 extending downwardly to the hot well 9. The barometric condenser 7 is also connected by pipe 10 to the vacuum pump 11.

In the installation referred to, the oil is introduced by a pipe 12 into the preheater 13 in which it is heated by any desired means (not shown), the details of construction of the preheater being immaterial. The oil is heated therein to a temperature preferably somewhat less than that at which the odor-bearing constituents of the oil may be evaporated.

A gaseous carrier such as hydrogen or other gas, heated to a proper temperature for causing the evaporation of the odor-bearing bodies at the pressure maintained within still 1, or superheated steam, is introduced into still 1 by pipe 14. This connects with a perforated pipe 15 within the lower part of still 1. Oil is led from preheater 13 through pipe connection 16 to the perforated pipe 17 within the still, a pump 18 preferably being used for forcing the oil through the perforations of pipe 17.

The pipes 15 and 17 provided with perforations or nozzles may be arranged in any suitable manner within the still so that an intimate intermixture of the gaseous carrier and sprayed oil may take place. The oil and carrier may issue, for example, from concentric openings in the same nozzle, or the carrier may issue from nozzles or perforations immediately below the nozzles or perforations through which the oil is sprayed, as is shown in the drawings. In either case or in other arrangements, the oil will be considerably subdivided so that a large surface area of the same will be exposed to the action of the hot gaseous carrier so that evaporation is facilitated. The carrier and the evaporated bodies are quickly removed by the action of the pump 11, the speed of removal increasing the effectiveness with which the volatile odor-bearing constituents of the oil are separated from the unevaporated oil.

The odor-bearing constituents of the oil are condensed to considerable extent, together with some of the steam in the condenser 3 which may be of any suitable character, such as a drum containing pipes through which a cooling fluid may be passed (not shown). The remainder of the steam is condensed in the barometric condenser 7 and flows to the hot well 9.

In the installation described a second still 1' is illustrated connected to condenser 3 by a connection 2'. This still is provided with a pipe 14' leading a suitable gaseous carrier to the pipe 15' within the still which is provided with suitable perforations or nozzles. The bottom of still 1 is connected by means of pipe 16' to the pipe 17' within still 1' which is provided with suitable perforations or nozzles. A pump 18' is preferably used for drawing the unevaporated oil from the bottom of still 1 and forcing it in the form of spray into the still 1', in which a further amount of odor-bearing bodies is removed from the oil. The operation may be continued through as many stills as is found necessary to complete the removal of the objectionable substances.

A modified form of apparatus is indicated in Fig. 2 in which a single still 1ᵃ is indicated. In this case the oil is led from the preheater 13 through connection 16ᵃ to the perforations or nozzles in the pipe 17ᵃ in the still, the gaseous carrier being introduced into the still through the perforations or nozzles in pipe 15ᵃ within the still. A pump 18ᵃ is used for forcing the oil into the still. The unevaporated oil may be returned from the bottom of still 1' to the preheater 13, by a suitable pumping means and the process continued with a repeated passage of the oil through the nozzles of pipe 17ᵃ within still 1ᵃ as many times as is found desirable. Or the oil may be drawn from the bottom of the still by a connection 19 and pumped by a pump 20 into the connection 16ᵇ at a point between the pump 18ᵃ and the still. In this case the valve 21 in connection 19 is first closed and a suitable relatively small quantity of oil is pumped from the preheater through the nozzles in pipe 17ᵃ into still 1ᵃ, after which the valve 22 in connection 16ᵃ is closed and valve 21 opened, pump 20 thereupon being operated to continuously circulate the oil which has been introduced into the still, through the nozzles in pipe 17ᵃ and thence back to pump 20, until the oil has been sufficiently purified.

It will be understood that our invention is as broad as is indicated by the accompanying claims.

What we claim is:—

1. A process of deodorizing oil, which comprises bringing it, in the form of spray, only, into contact with a gaseous carrier, in a vacuum, at a temperature sufficient for the evaporation of odorous constituents of the oil, and continuously removing the unevaporated oil quickly to a place of considerably lower temperature than that in which the oil spray and carrier mingled.

2. A process of deodorizing oil, which comprises bringing it, in the form of spray, only, into contact with a gaseous carrier, at a temperature sufficient for the evaporation of odorous constituents of the oil, continuously removing the unevaporated oil to a place of considerably lower temperature than that in which the oil spray and carrier mingled, again mingling the oil, in the form of spray, with the carrier, and repeating the process, if necessary, until the oil is substantially deodorized.

3. A process of deodorizing oil, which comprises preheating the oil, spraying the same into intimate contact with a gaseous carrier, at a place removed from that in which the oil is preheated, and subjecting it, while mingling with the carrier, to a temperature sufficient to cause the evaporation of odorous constituents of the oil, and causing the rapid removal of the unevaporated oil from the zone of relatively high heat, so that the unevaporated oil will be subjected to decomposing temperature for a short time only.

4. A process of deodorizing oil, which comprises bringing the oil, in the form of spray, only, into contact with a non-oxidizing gaseous carrier, in a vacuum, at a temperature sufficient for the evaporation of odorous constituents of the oil, causing the carrier and evaporated material to be quickly removed, and causing the unevaporated oil to be quickly removed, after its spraying, from the point of highest heat application, so that it will be subjected to decomposing temperature for a short time only.

5. The process of deodorizing oil, which comprises bringing it, in the form of spray, only, into contact with a gaseous carrier at a temperature sufficient for the evaporation of odorous constituents of the oil, causing the carrier and evaporated material to be quickly removed, and preventing any considerable body of the unevaporated oil from remaining at or near the place where the oil, spray and carrier mingled by quickly removing the same to a place of lower temperature.

6. A process of deodorizing oil, which comprises bringing the oil, in the form of spray, only, into contact with hot hydrogen gas, in a vacuum, at a temperature sufficient for the evaporation of odorous constituents of the oil, causing the carrier and evaporated material to be quickly removed, and causing the unevaporated oil to be quickly removed, after its spraying, from the point of highest heat application, so that it will be subjected to decomposing temperature for a short time only.

7. In apparatus for deodorizing oils, the combination of a vacuum still, means for spraying oil therein, means for introducing a gaseous carrier therein, into contact with the sprayed oil, and pumping means for continuously removing unevaporated oil from the bottom of the still.

8. In apparatus for deodorizing oils, the combination of distilling means, a condenser and means for maintaining a vacuum in said distilling means, connected therewith, means for spraying oil in said distilling means, means for introducing a gaseous carrier therein, into contact with the sprayed oil, and means for continuously removing the unevaporated oil from said distilling means and repeatedly spraying the same oil therein.

This specification signed and witnessed this 31st day of July, 1919.

JOHN W. BODMAN.
TRUMAN M. GODFREY.

Witnesses:
WM. A. NELSON,
HELEN DONOVAN.